United States Patent
Krueger

[15] 3,644,208
[45] Feb. 22, 1972

[54] LEAK-STOPPING COMPOSITION
[72] Inventor: Achim R. Krueger, Cherry Hill, N.J.
[73] Assignee: E. I. du Pont de Nemours and Company, Wilmington, Del.
[22] Filed: Dec. 19, 1968
[21] Appl. No.: 785,332

Related U.S. Application Data

[63] Continuation-in-part of Ser. No. 748,930, July 31, 1968, abandoned.

[52] U.S. Cl.....................................252/72, 106/33, 252/73
[51] Int. Cl. .........................................................C09k 3/12
[58] Field of Search......................252/72, 73, 75, 77, 8.5 LC; 106/33; 260/2.5 B, 93.5 W

[56] References Cited

UNITED STATES PATENTS

| | | | |
|---|---|---|---|
| 2,502,191 | 3/1950 | Williams | 252/8.5 LC |
| 2,566,567 | 9/1951 | Hutchinson et al. | 252/93.5 W |
| 2,652,392 | 9/1953 | Hohenstein et al. | 252/93.5 |
| 3,034,998 | 5/1962 | Hatch | 252/72 X |
| 3,243,419 | 3/1966 | Ingram | 260/93.5 W |
| 3,358,703 | 12/1967 | Ginsburgh | 252/72 X |

Primary Examiner—Leon D. Rosdol
Assistant Examiner—Harris A. Pitlick
Attorney—Melville J. Hayes

[57] ABSTRACT

There is disclosed a liquid composition which is adapted for use as a leak-stopper in heat-exchangers (e.g. automobile radiators) or other vessels designed to hold a liquid; said composition comprises (A) a liquid (e.g. water and/or a suitable alcohol) which is inert to the inside of the vessel and to certain polymeric particles (component B) dispersed therein under the conditions of using the composition, and (B) dispersed in said liquid, substantially spherical particles (within certain size requirements) of a polymeric material which is a solid (non-liquid) under the conditions of using the composition (e.g., a polymeric material containing certain proportions of polyvinyl pyrrolidone (PVP) and polystyrene or a copolymer of styrene and methacrylic acid); preferably at least some of said particles are hollow.

10 Claims, No Drawings

LEAK-STOPPING COMPOSITION

CROSS-REFERENCE TO RELATED APPLICATION

This is a continuation-in-part of my patent application Ser. No. 748,930 filed July 31, 1968 and now abandoned.

BACKGROUND OF THE INVENTION

This invention relates to a liquid composition which is adapted for use as a leak-stopper in heat-exchangers (e.g., automobile radiators) or other vessels designed to hold a liquid. A preferred embodiment of the invention concerns an antifreeze composition having utility as a leak-stopper in automobile radiators.

It is well known that automobile radiators often develop leaks which can result in loss of radiator coolant and antifreeze liquids; and such loss of radiator liquids can be very costly in terms of frequent replacement of antifreeze, damage to the engine, or cost of having the leaky radiator removed and repaired or replaced with a new one.

The prior art describes compositions in which fibers, pigments, ground nut shells, rice hulls or the like, or combinations of such materials, are dispersed in the radiator liquid for the purpose of closing any small cracks and holes in the radiator or other parts of the cooling system. Among the drawbacks of the prior art radiator leak-stopping compositions are the following: excessive settling of the dispersed particles; a stable leak-stopping dispersion of the particles cannot be formed in conventional antifreeze liquids so as to provide protection against both leakage and freezing over an extended period of time; undue accumulation on, abrasion of, or reaction with, certain parts of the cooling system. There is therefore a need for a leak-stopping composition adapted to overcome these and other drawbacks of the prior art compositions.

SUMMARY OF THE INVENTION

Expressed broadly, the present invention provides a liquid composition, adapted for use as a leak-stopper in heat-exchangers or other vessels designed to hold a liquid, comprising A. a liquid which is substantially inert to the inside of the vessel and to component B under the conditions of using said composition, and B. dispersed in component A, substantially spherical particles of a polymeric material insoluble in A, about 5-85 percent by weight of said particles having an average diameter of about 0.1-20 microns, and about 95-15 percent by weight of said particles having an average diameter of about 21-1,000 microns. "About 21-1,000" means greater than about 20 up to about 1,000.

DESCRIPTION OF PREFERRED EMBODIMENTS

Typical liquids useful as component (A) of the novel composition are water, monohydric alcohols, polyhydric alcohols, glycol ethers, oils, and mixtures of two or more such liquids. Useful monohydric alcohols include methanol, ethanol, isopropanol and the like. Useful polyhydric alcohols include ethylene glycol, propylene glycol, diethylene glycol, glycerine, dipropylene glycol, 1,3-butylene glycol, polyethylene glycols, polypropylene glycols. Useful glycol ethers include methoxypropanol, methyl and ethyl ethers of ethylene glycol, diethylene glycol and propylene glycol. An especially useful liquid component is ethylene glycol, or a mixture thereof with about 1-90 percent of water based on the total weight of the two liquids. Also useful are such liquids as o-dichlorobenzene, chlorinated biphenyls, diphenyloxide/diphenyl, terphenyls and tetraaryl silicate. Component A can also be a wax or other material which is a solid at ordinary room temperatures, but is a liquid at the temperature at which the composition is used.

When the composition is to be used in automobile radiators and the like, preferably about 15-95 percent by weight of the component B particles have an average diameter of about 21-500 microns. The particle size can be measured by electron microscopy, for example by the technique described in "Emulsion Polymerization" by Bovey et al., Interscience Publishers, 1955, page 290; particle size range can be measured by the apparatus known in the art as the Coulter Counter. In a preferred embodiment of such a composition, about 10-100 percent by weight of the 21-500 micron particles are hollow. It is especially desirable to use hollow particles when the polymeric material thereof is relatively rigid under the conditions of using the composition. Preferably about 0.1-50 percent by weight of the component B particles have an average diameter of about 100-500 microns, and about 1-100 percent by weight of the 100-500 micron particles are hollow.

The space or voids within the hollow particles can vary from a minor to a major proportion of the volume of the particles. In many cases this space is preferably filled or partially filled with a liquid; for example, the liquid of component A. In some of the most useful compositions, the particle voids contain about 10-85 percent of liquid A based on the combined weight of the hollow polymeric spheres and liquid therein. To avoid undue settling or agglomeration of the particles and for other reasons associated with efficient utility, it is often desirable to employ particles whose density is similar to that of the external liquid A component; this desireable condition is readily obtainable in the present composition by employing the hollow liquid-containing particles.

The component B particles are made up of a polymeric material which is a solid (nonliquid) under the conditions of using the composition. The particles are substantially spherical; they can have the configuration of a perfect sphere or a distorted sphere. They are not fibrous.

The composition usually contains about 0.001-1.0 percent of component B particles based on the weight of the composition.

In some of the most useful embodiments of the composition, the polymeric material of the component B particles has attached thereto a polymeric dispersion stabilizer composed of polymer molecules having at least one portion soluble in liquid A and at least one other portion insoluble in liquid A but soluble in the monomer from which polymeric component B is prepared. The weight ratio of component B to said dispersion stabilizer is preferably about 75:25 to 99.9:0.1. Especially useful as the polymeric dispersion stabilizer component is PVP (polyvinyl pyrrolidone) grafted with polystyrene or a styrene copolymer. The dispersion stabilizer can be prepared by grafting or otherwise attaching (1) a liquid A insoluble polymer (e.g., a styrene polymer) to (2) a liquid A soluble polymer (e.g., PVP) so that (1) and (2) form composite polymer molecules.

It can be seen in the examples below that the novel composition can be prepared by carrying out the polymerization of a suitable monomer component (e.g., styrene or a blend of styrene and methacrylic acid) in the presence of PVP (with or without styrene polymer grafted thereto) in a suitable liquid polymerization reaction medium, for example, in a solvent for the polyvinyl pyrrolidone. When a grafted polymeric material is desired in the composition, one skilled in the art will be able to provide suitable reaction conditions so that the resulting polymer (e.g., styrene homopolymer or copolymer) is grafted onto the polyvinyl pyrrolidone at pendant sights of free radical attack.

In some embodiments of the invention, the composition has one or more of the following characteristics:

1. There is also dispersed in component A about 1-50 percent of hexamethoxymethyl melamine based on the weight of component B, preferably about 0.005-0.25 percent of said melamine based on the total weight of the composition.

2. The polymeric material (other than dispersion stabilizer) of component B is polystyrene, or a copolymer of about 0.1-30 percent by weight of an ethylenically unsaturated carboxylic acid and about 99.9-70 percent by weight of styrene, the copolymer preferably being a copolymer of about 2-18 percent methacrylic acid and 98-82 percent styrene.

3. The polymeric material of component B is any other polymer which is insoluble enough in liquid A to retain the specified particle characteristics.

4. The polymeric material (other than dispersion stabilizer) of component B is polystyrene, the dispersion stabilizer portion of the particles is PVP grafted with polystyrene, and the weight ratio of polystyrene to PVP in the particles is about 90:10 to 99.9:0.1, preferably about 97:3 to 99.7:0.3.

5. All or part of the PVP portion of the dispersion stabilizer is replaced with another polymer adapted to form a suitable dispersion stabilizer in the particular composition, for example, a polymer selected from polyethylene glycols, polyethylene imines, polyacrylic acid, polyitaconic acid and the like.

6. The attachment of the liquid A insoluble portion to the liquid A soluble portion of the dispersion stabilizer is by means other than grafting, for example by reacting coreactive functional groups of the two different materials, or by block copolymer formation; one skilled in the art will be able to employ such other known methods for making composite molecules in preparing the dispersion stabilizer described as preferred in this invention;

7. The composition contains about 0.03–0.20 percent of component B particles based on the weight of the composition, The composition can also contain one or more additives such as those known to be useful in heat-exchanger liquids, for example anticorrosion agents, antifoaming agents, coloring agents, buffers and surfactants.

The composition of the present invention is useful as a leak-stopper in automobile radiators or other heat exchangers, or in other vessels designed to hold a liquid. Compositions of this invention can be used as leak-stoppers in such devices as the hot water heating systems of buildings, in the cooling systems of high-power electron tubes and other electronic equipment, and in the heat exchangers of various high-powered engines.

Compositions are obtainable according to this invention which undergo no undue settling or agglomeration of the dispersed particles; which provide protection against both leaking and freezing over an extended period of time; which cause no undue accumulation on, abrasion of, or reaction with, the interior surfaces of the heat-exchange system; and which are useful heat-transfer liquids over a wide range of summer and winter temperatures.

The examples which follow are given for the purpose of illustrating the invention. All quantities shown are on a weight basis unless otherwise indicated.

EXAMPLE 1

A composition which is useful in automobile radiators as a leak-stopper, antifreeze and heat transfer liquid over a wide range of summer and winter temperatures is prepared by a. adding 20 parts of 40,000 molecular weight PVP (polyvinyl pyrrolidone) and 56 parts ethylene glycol to a three-neck flask equipped with a stirrer, thermometer, condenser and monomer feed funnel;

b. stirring the contents of the flask while heating at 75° C. to form a solution of the PVP in the glycol;

c. adding to the resulting polymer solution a mixture of 40 parts styrene and 1.2 parts of a 75 percent solution of t-butyl-peracetate in mineral spirits;

d. stirring the contents of the flask to form an emulsion of the materials added in step (c.) in the glycol, and heating to 150° C.;

e. adding 188 parts ethylene glycol having a temperature of 22° C. and heating the resulting composition to 140° C.;

f. adding gradually over a period of 8 minutes with stirring a mixtures of 63.7 parts styrene, 10.5 parts methacrylic acid and 0.7 part of the peracetate solution mentioned in step (c); during the resulting exothermic reaction the temperature of the composition reaches 160° C. and there is formed a styrene/methacrylic acid copolymer (ratio about 91/9); the copolymer is believed to be grafted onto the PVP;

g. cooling the resulting composition to 120° C. and adding 38 parts of ethylene glycol and 0.4 part of the peracetate solution mentioned in step (c);

h. stirring the composition for 1 hour while its temperature is at 110°–115° C., then heating the composition to 140° C., and finally cooling it to 22° C.; each 100 parts of the composition now contains about 25 parts of substantially spherical polymer particles (PVP plus copolymer) dispersed in 75 parts of ethylene glycol; the PVP: copolymer weight ratio is about 15:85; a small number of the particles are larger than 500 microns, and these are removed by filtration; about 80 percent of the particles remaining have an average diameter of about 0.1–20 microns and about 20 percent of the particles have an average diameter of about 21–500 microns; many of the 21–500 micron particles are hollow and many of them are over 100 microns in diameter;

i. mixing 5 parts of hexamethoxymethyl melamine ("-Cymel" 301 from American Cyanamid) with 95 parts of the product of (h);

j. mixing 0.43 part of the product of (i) with 99.57 parts of an ethylene glycol-type radiator antifreeze composition which contains in each 100 parts thereof about 95 parts ethylene glycol, 2.9 parts water, 0.1 part antifoaming agent (nonionic surfactant) and 2.0 parts corrosion inhibitor.

All or nearly all the space inside each hollow particle has therein a liquid having about the same composition as the liquid which forms the external phase of the composition. In the process of Example 1, a portion of the styrene copolymer is attached (grafted) to the PVP to form composite polymer molecules which serve as a polymeric dispersion stabilizer.

The resulting composition has beneficial utility as a radiator leak-stopper and heat-transfer liquid during all seasons of the year. A radiator of a car whose cooling system had been leaking at the rate of 2 quarts of radiator liquid per week through small cracks in the radiator is filled with the product of Example 1; 2 days later and again 3 months later, the radiator is examined for leaks and is found to be in a completely nonleaking condition.

Useful results can also be obtained when Example 1 is repeated except enough of the smaller particles are removed from the composition so that the product contains about 10 percent by weight of about 0.1–20 micron particles and about 90 percent by weight of about 21–300 micron particles based on the total weight of polymeric material in the particles.

When a composition is prepared having about the same kind of liquid and particle components as in Example 1 except none of the particles are hollow, the composition is useful but not as effective as the composition of Example 1.

EXAMPLE 2

A leak-stopper composition having similar utility and properties to the product of Example 1 is prepared by 1. adding 50 parts of PVP to a flask equipped with stirrer, water-cooled condenser, thermometer and monomer-feed funnel;

2. adding to the flask a mixture of 50 parts styrene and 0.4 part of the peracetate solution mentioned in step (c) of Example 1, and stirring the contents of the flask for 30 minutes;

3. adding to the flask with stirring 180 parts ethylene glycol and heating the mixture for 1 hour at 110°–120° C.;

4. adding to the flask gradually with stirring 230 parts ethylene glycol while keeping the temperature of the mixture at 110° C.;

5. adding to the flask gradually with stirring over a period of 3 hours a mixture of 217 parts styrene, 27 parts methacrylic acid and 0.9 parts of said peracetate solution while keeping the temperature at 110° C., and keeping the temperature at 110° C. for another one-half hour before heating the composition to 140° C.;

6. adding 389 parts of ethylene glycol and allowing the temperature of the composition to drop to 22° C.;

7. repeating steps (i) and (j) of Example 1 to complete the preparation of the composition.

EXAMPLE 3

A composition having similar utility and properties to the product of Example 1 is prepared by 1. adding 74.7 parts ethylene glycol and 3.73 parts PVP to a flask as described in step (1) of Example 2, and stirring the contents of the flask while heating at 80° C. until there is formed a solution of the PVP in the glycol;
2. adding to the resulting solution with stirring a mixture of 19.26 parts styrene, 1.94 parts methacrylic acid and 0.37 parts of t-butylperacetate dissolved in mineral spirits, heating the mixture to 140° C., and keeping it at a temperature of 140°–150° C. for one-half hour;
3. cooling the composition to 120° C. and keeping it at this temperature for 1 hour;
4. allowing the temperature of the composition to drop to 22° C., and repeating steps (i) and (j) of Example 1 to complete preparation of the composition.

EXAMPLE 4

A composition having utility similar to that of the product of Example 1 is prepared by 1. making for use in step 4 below a mixture of 30 parts styrene, 0.12 part of a 75 percent solution of t-butyl-peracetate in mineral spirits, and 35.38 parts butanol;
2. into a separate flask of the pressure polymerization type equipped with a stirrer, thermometer, feed funnel and water-cooled condenser, introducing 15 parts PVP and 15 parts butanol, and stirring the contents of the flask while heating at 100° C. until there is formed a solution of the PVP in the butanol;
3. adding to the resulting solution 4.5 parts styrene and heating the solution to 135° C.;
4. adding to the flask 1.6 parts of the mixture made in step (1), and after raising the temperature of the flask from 135° C. to 140° C., gradually adding the remainder of the mixture made in step (1) over a period of 5.5 hours while stirring and keeping the temperature at 140° C.;
5. allowing the composition to cool to 22° C., resulting in a viscous white liquid;
6. making for use in step (8) below a mixture of 2.3 parts of the product of step (5), 0.12 part of a 75 percent solution of t-butyl-peracetate in mineral spirits and 22.58 parts styrene;
7. charging a flask as described in step (2) with 75 parts ethylene glycol and heating to 110° C.;
8. adding to the flask the mixture made in step (6) and then heating the resulting mixture at 115° C. for 4 hours;
9. heating the resulting mixture at 140° C. for 30 minutes and then allowing it to cool to 22° C.; and
10. mixing 0.43 part of the product of (9) with 99.57 parts of an antifreeze composition as described in (j) of Example 1 to complete the preparation of the leak-stopping composition.

The PVP:polystyrene weight ratio in the composition is about 1.4:98.6. The PVP is attached to a portion of the polystyrene of the spherical polymeric particles whereby composite polymer molecules are formed; it is believed that a portion of the polystyrene is grafted to the PVP. Although the PVP portion of the composite molecules is soluble in the liquid phase of the composition, practically all the PVP remains in the spherical particles. The composite PVP-polystyrene molecules are believed to function largely as a dispersion stabilizer, providing stability to the dispersion and also enabling one to obtain the desired spherical polystyrene particle size.

About 25 percent by weight of the particles have an average diameter of about 0.1–20 microns and about 75 percent have an average diameter of about 21–500 microns. Many of the particles (e.g., a large percentage of the larger ones) are hollow, having a cross-sectional configuration resembling that of a musk melon or tennis ball, with the space inside the polymeric shell filled or partially filled with the antifreeze liquid added in step (10). Many of these particles contain 50–70 percent or more of the liquid based on the combined weight of polymer shell and liquid therein. The particles in the product of Example 4 are stronger and more fracture-resistant than those in the product of Example 1.

Water or other liquids miscible with the liquid portion of the composition and which do not dissolve the particles can be added to the product of any of the above examples without harming its utility for particular applications. And when this is done, the composition of the liquid within the hollow particles soon becomes about the same as that outside the particles since the particles are liquid-permeable. This is a beneficial characteristic of certain preferred embodiments of the invention. Because of the ability of the particles to contain an original liquid phase, and then to have the liquid therein change in composition in accordance with changes made in the composition of the external phase liquid, the liquid-containing particles are adapted to provide (a) improved resistance to settling and separation of the particles, (b) minimum damage to the vessel and the particles when the composition is pumped towards various internal parts of a cooling system or the like, and (c) efficient and useful heat-exchange and leak-stopping compositions in which the polymer particles employ a relatively small amount of polymer in relation to the volume and weight of the particles.

I claim:

1. A liquid composition, adapted for use as a leak-stopper in heat-exchangers or other vessels designed to hold a liquid consisting essentially of
   A. a liquid which is substantially inert to the inside of the vessel and to component B under the conditions of using said composition, said liquid is at least one liquid selected from the group consisting of water, methanol, ethanol, isopropanol, ethylene glycol, glycerine, dipropylene glycol, 1,3-butylene glycol, polyethylene glycol, polypropylene glycol, methoxypropanol, methyl and ethyl ethers of ethylene glycol, diethylene glycol and propylene glycol, and
   B. dispersed in component A, substantially spherical particles of a polymeric material insoluble in A, about 5–85 percent by weight of said particles having an average diameter of about 0.1–20 microns, and about 95–15 percent by weight of said particles having an average diameter of about 21–500 microns, with about 10–100 percent by weight of said 21–500 micron particles being hollow particles, said polymeric material selected from the group consisting of polystyrene and copolymers of about 0.1–30 percent by weight of methacrylic acid and about 99.9–70 percent by weight of styrene, and a polymeric dispersion stabilizer composed of composite polymer molecules having one portion soluble in liquid A and another portion insoluble in liquid A but soluble in the monomer from which the polymeric material of component B is prepared, wherein the portion of said dispersion stabilizer soluble in liquid A is polyvinyl pyrrolidone (PVP) and wherein the portion of said dispersion stabilizer insoluble in liquid A is polystyrene, and wherein the weight ratio of the polymeric material other than dispersion stabilizer to said dispersion stabilizer is about 75:25 to 99.9:0.1, component B being present in said composition in an amount of about 0.001 percent to 1.0 percent by weight.

2. A composition according to claim 1 wherein the interior voids of said hollow particles contain about 10–85 percent of liquid A based on the combined weight of the polymeric material and liquid in the particles.

3. A composition according to claim 1 wherein about 0.1–50 percent by weight of the particles of component B have an average diameter of about 100–500 microns, and about 1–100 percent by weight of the 100–500 micron particles are hollow particles.

4. A composition according to claim 1 wherein component A has an ethylene glycol content of about 10–100 percent by weight and a water content of about 0–90 percent by weight.

5. A composition according to claim 4 wherein the percent weight ratio of styrene polymer to PVP in the particles of component B is about 90:10 to 99.9:0.1.

6. A composition according to claim 4 wherein the percent weight ratio of styrene polymer to PVP in the particles of component B is about 97.3 to 99.7:0.3.

7. A composition according to claim 6 wherein the component B polymeric material other than PVP is a copolymer of about 2–18 percent by weight of methacrylic acid and about 98–82 percent by weight of styrene.

8. A composition according to claim 7 containing about 0.03–0.20 percent of component B particles based on the weight of the composition.

9. A liquid composition adapted for use as a freeze-resistant coolant and leak-stopper in automobile radiators and the like, consisting essentially of
   A. a liquid component composed of about 0–90 percent by weight of water and about 10–100 percent by weight of at least one liquid selected from the group consisting of water, methanol, ethanol, isopropanol, ethylene glycol, glycerine, dipropylene glycol, 1,3-butylene glycol, polyethylene glycol, polypropylene glycol, methoxypropanol, methyl and ethyl ethers of ethylene glycol, diethylene glycol and propylene glycol, and
   B. dispersed in component A, substantially spherical particles comprised of a styrene polymer insoluble in A and selected from the group consisting of polystyrene and copolymers of about 0.1–30 percent by weight of methacrylic acid and about 99.9–70 percent by weight styrene, said particles also containing, as a dispersion stabilizer, composite polymer molecules composed of styrene polymer attached to PVP, the overall weight ratio of styrene polymer to PVP in the particles of component B being about 75:25 to 99.9:0.1, Component B being about 0.001–1.0 percent by weight of said composition, and about 5–85 percent by weight of the particles of component B having an average diameter of about 0.1–20 microns and about 95–15 percent by weight of said particles having an average diameter of about 21–500 microns, with about 10–100 percent by weight of said 21–500 micron particles being hollow particles.

10. A composition according to claim 9 wherein about 0.1–50 percent by weight of the particles of component B have an average diameter of about 100–500 microns, and about 1–100 percent by weight of the 100–500 micron particles are hollow particles containing about 10–85 percent of liquid A based on the combined weight of polymeric material and liquid in the particles.

* * * * *